US010528447B2

(12) United States Patent
Campos Peiro et al.

(10) Patent No.: US 10,528,447 B2
(45) Date of Patent: Jan. 7, 2020

(54) STORAGE SYSTEM PERFORMANCE MODELS BASED ON EMPIRICAL COMPONENT UTILIZATION

(71) Applicant: International Business Machines Corporation, Armonk, NY (US)

(72) Inventors: Eduardo Campos Peiro, Tucson, AZ (US); Joshua D. Martin, Tucson, AZ (US); Bruce McNutt, Gilroy, CA (US); Vernon W. Miller, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 192 days.

(21) Appl. No.: 15/594,124

(22) Filed: May 12, 2017

(65) Prior Publication Data
US 2018/0329796 A1 Nov. 15, 2018

(51) Int. Cl.
*G06F 17/30* (2006.01)
*G06F 11/34* (2006.01)
*G06F 7/24* (2006.01)

(52) U.S. Cl.
CPC ............ *G06F 11/3447* (2013.01); *G06F 7/24* (2013.01); *G06F 11/3485* (2013.01); *G06F 11/3409* (2013.01); *G06F 11/3414* (2013.01); *G06F 11/3442* (2013.01); *G06F 2201/88* (2013.01)

(58) Field of Classification Search
USPC ........ 707/607, 609, 687, 705, 790, 813, 821
See application file for complete search history.

(56) References Cited

U.S. PATENT DOCUMENTS

| 5,899,988 | A | * | 5/1999 | Depledge | G06F 16/22 |
| 8,688,878 | B1 | | 4/2014 | Dolan et al. | |
| 9,514,022 | B1 | | 12/2016 | Basak et al. | |
| 2014/0122546 | A1 | | 5/2014 | Liao et al. | |
| 2014/0222444 | A1 | * | 8/2014 | Cerello | G06Q 10/00 705/2 |
| 2016/0219107 | A1 | | 7/2016 | Jain et al. | |
| 2017/0132058 | A1 | | 5/2017 | McNutt | |
| 2018/0307578 | A1 | * | 10/2018 | McNutt | G06F 11/3452 |

OTHER PUBLICATIONS

Noorshams et al., Predictive Performance Modeling of Virtualized Storage Systems using Optimized Statistical Regression Techniques, Proceedings of the 4th ACM/SPEC International Conference on Performance Engineering, Mar. 2013, pp. 1-12.
Song et al., "Queueing-based Storage Performance Modeling and Placement in OpenStack Environments," 21st International Conference on High Performance Computing (HiPC), IEEE, 2014, pp. 1-10.
McNutt, U.S. Appl. No. 14/937,999, filed Nov. 11, 2015.
McNutt, "System Utilization: Keeping the Glass Half Full," CMG Proceedings, Nov. 2016, pp. 1-6.
Peiro et al., U.S. Appl. No. 16/596,390, filed Oct. 8, 2019.

* cited by examiner

*Primary Examiner* — Sana A Al-Hashemi
(74) *Attorney, Agent, or Firm* — Zilka-Kotab, P.C.

(57) ABSTRACT

A computer-implemented method according to one embodiment includes identifying aggregated customer performance data for a system resource, creating a first system map for the system resource, utilizing the aggregated customer performance data, comparing the first system map to a second system map created for the system resource utilizing calibration data, and adjusting the second system map, based on the comparing.

18 Claims, 4 Drawing Sheets

STORAGE SYSTEM PERFORMANCE MODELS BASED ON EMPIRICAL COMPONENT UTILIZATION

BACKGROUND

The present invention relates to identifying system resource overheads, and more specifically, this invention relates to improving an estimation of system resource overheads utilizing customer performance data.

Storage system models are commonly used for approximating overheads for resources of the storage system. These overheads may be estimated utilizing validation workloads created in a laboratory processing and storage environment. However, customer usage of a storage system is often more complex than laboratory validation workloads, which may result in inaccurate sizing recommendations.

SUMMARY

A computer-implemented method according to one embodiment includes identifying aggregated customer performance data for a system resource, creating a first system map for the system resource, utilizing the aggregated customer performance data, comparing the first system map to a second system map created for the system resource utilizing calibration data, and adjusting the second system map, based on the comparing.

According to another embodiment, a computer program product for improving storage system performance models based on empirical component utilization includes a computer readable storage medium having program instructions embodied therewith, wherein the computer readable storage medium is not a transitory signal per se, and where the program instructions are executable by a processor to cause the processor to perform a method comprising identifying aggregated customer performance data for a system resource, utilizing the processor, creating a first system map for the system resource, utilizing the aggregated customer performance data, utilizing the processor, comparing the first system map to a second system map created for the system resource utilizing calibration data, utilizing the processor, and adjusting the second system map based on the comparing, utilizing the processor.

A system according to another embodiment includes a processor, and logic integrated with the processor, executable by the processor, or integrated with and executable by the processor, where the logic is configured to identify aggregated customer performance data for a system resource, create a first system map for the system resource, utilizing the aggregated customer performance data, compare the first system map to a second system map created for the system resource utilizing calibration data, and adjust the second system map, based on the comparison.

Other aspects and embodiments of the present invention will become apparent from the following detailed description, which, when taken in conjunction with the drawings, illustrate by way of example the principles of the invention.

DETAILED DESCRIPTION

Figure 1:
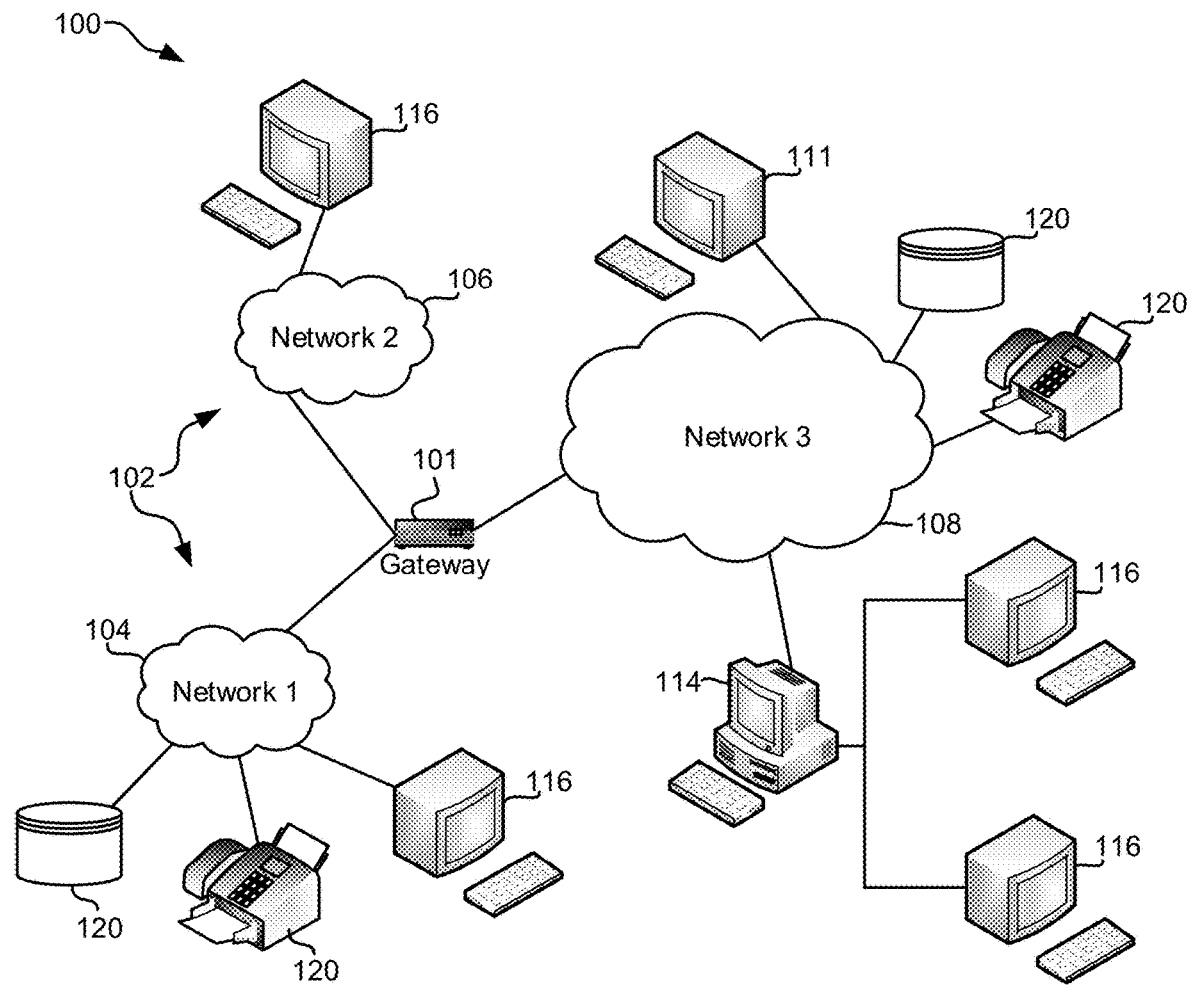
FIG. 1 illustrates a network architecture, in accordance with one embodiment.

The following description discloses several preferred embodiments of systems, methods and computer program products for improving storage system performance models based on empirical component utilization. Various embodiments provide a method to create a system map based on customer performance data, and use that map to improve a system map created utilizing calibration data.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified. It will be further understood that the terms "includes" and/or "comprising," when used in this specification, specify the presence of stated features, integers, steps, operations, elements, and/or components, but do not preclude the presence or addition of one or more other features, integers, steps, operations, elements, components, and/or groups thereof.

The following description discloses several preferred embodiments of systems, methods and computer program products for improving storage system performance models based on empirical component utilization.

In one general embodiment, a computer-implemented method includes identifying aggregated customer performance data for a system resource, creating a first system map for the system resource, utilizing the aggregated customer performance data, comparing the first system map to a second system map created for the system resource utilizing calibration data, and adjusting the second system map, based on the comparing.

In another general embodiment, a computer program product for improving storage system performance models based on empirical component utilization includes a computer readable storage medium having program instructions embodied therewith, wherein the computer readable storage medium is not a transitory signal per se, and where the program instructions are executable by a processor to cause the processor to perform a method comprising identifying aggregated customer performance data for a system resource, utilizing the processor, creating a first system map for the system resource, utilizing the aggregated customer performance data, utilizing the processor, comparing the first system map to a second system map created for the system resource utilizing calibration data, utilizing the processor, and adjusting the second system map based on the comparing, utilizing the processor.

In another general embodiment, a system includes a processor, and logic integrated with the processor, executable by the processor, or integrated with and executable by the processor, where the logic is configured to identify aggregated customer performance data for a system resource, create a first system map for the system resource, utilizing the aggregated customer performance data, compare the first system map to a second system map created for the system resource utilizing calibration data, and adjust the second system map, based on the comparison.

FIG. 1 illustrates an architecture 100, in accordance with one embodiment. As shown in FIG. 1, a plurality of remote networks 102 are provided including a first remote network 104 and a second remote network 106. A gateway 101 may be coupled between the remote networks 102 and a proximate network 108. In the context of the present architecture 100, the networks 104, 106 may each take any form including, but not limited to a LAN, a WAN such as the Internet, public switched telephone network (PSTN), internal telephone network, etc.

In use, the gateway 101 serves as an entrance point from the remote networks 102 to the proximate network 108. As such, the gateway 101 may function as a router, which is capable of directing a given packet of data that arrives at the gateway 101, and a switch, which furnishes the actual path in and out of the gateway 101 for a given packet.

Further included is at least one data server 114 coupled to the proximate network 108, and which is accessible from the remote networks 102 via the gateway 101. It should be noted that the data server(s) 114 may include any type of computing device/groupware. Coupled to each data server 114 is a plurality of user devices 116. User devices 116 may also be connected directly through one of the networks 104, 106, 108. Such user devices 116 may include a desktop computer, lap-top computer, hand-held computer, printer or any other type of logic. It should be noted that a user device 111 may also be directly coupled to any of the networks, in one embodiment.

A peripheral 120 or series of peripherals 120, e.g., facsimile machines, printers, networked and/or local storage units or systems, etc., may be coupled to one or more of the networks 104, 106, 108. It should be noted that databases and/or additional components may be utilized with, or integrated into, any type of network element coupled to the networks 104, 106, 108. In the context of the present description, a network element may refer to any component of a network.

According to some approaches, methods and systems described herein may be implemented with and/or on virtual systems and/or systems which emulate one or more other systems, such as a UNIX system which emulates an IBM z/OS environment, a UNIX system which virtually hosts a MICROSOFT WINDOWS environment, a MICROSOFT WINDOWS system which emulates an IBM z/OS environment, etc. This virtualization and/or emulation may be enhanced through the use of VMWARE software, in some embodiments.

In more approaches, one or more networks 104, 106, 108, may represent a cluster of systems commonly referred to as a "cloud." In cloud computing, shared resources, such as processing power, peripherals, software, data, servers, etc., are provided to any system in the cloud in an on-demand relationship, thereby allowing access and distribution of services across many computing systems. Cloud computing typically involves an Internet connection between the systems operating in the cloud, but other techniques of connecting the systems may also be used.

Figure 2:
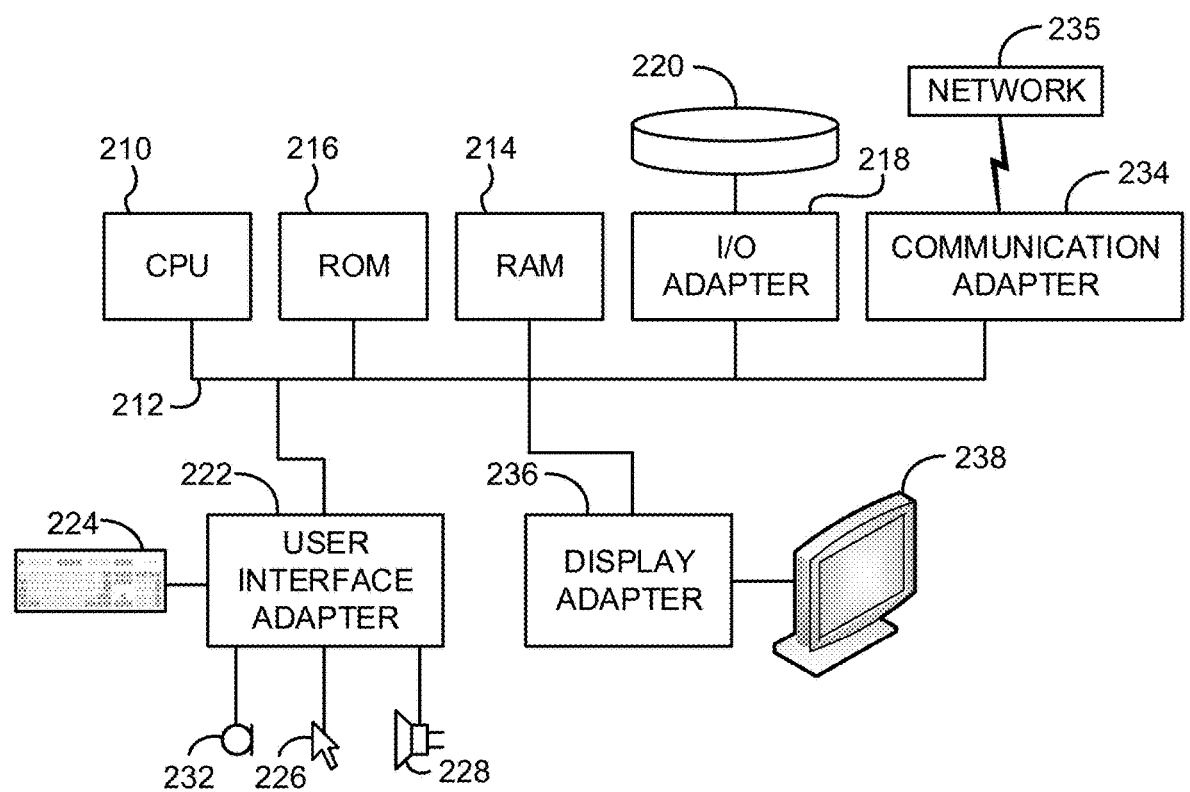
FIG. 2 shows a representative hardware environment that may be associated with the servers and/or clients of FIG. 1, in accordance with one embodiment.

FIG. 2 shows a representative hardware environment associated with a user device 116 and/or server 114 of FIG. 1, in accordance with one embodiment. Such figure illustrates a typical hardware configuration of a workstation having a central processing unit 210, such as a microprocessor, and a number of other units interconnected via a system bus 212.

The workstation shown in FIG. 2 includes a Random Access Memory (RAM) 214, Read Only Memory (ROM) 216, an I/O adapter 218 for connecting peripheral devices such as disk storage units 220 to the bus 212, a user interface adapter 222 for connecting a keyboard 224, a mouse 226, a speaker 228, a microphone 232, and/or other user interface devices such as a touch screen and a digital camera (not shown) to the bus 212, communication adapter 234 for connecting the workstation to a communication network 235 (e.g., a data processing network) and a display adapter 236 for connecting the bus 212 to a display device 238.

The workstation may have resident thereon an operating system such as the Microsoft Windows® Operating System (OS), a MAC OS, a UNIX OS, etc. It will be appreciated that a preferred embodiment may also be implemented on platforms and operating systems other than those mentioned. A preferred embodiment may be written using XML, C, and/or C++ language, or other programming languages, along with an object oriented programming methodology. Object oriented programming (OOP), which has become increasingly used to develop complex applications, may be used.

Figure 3:
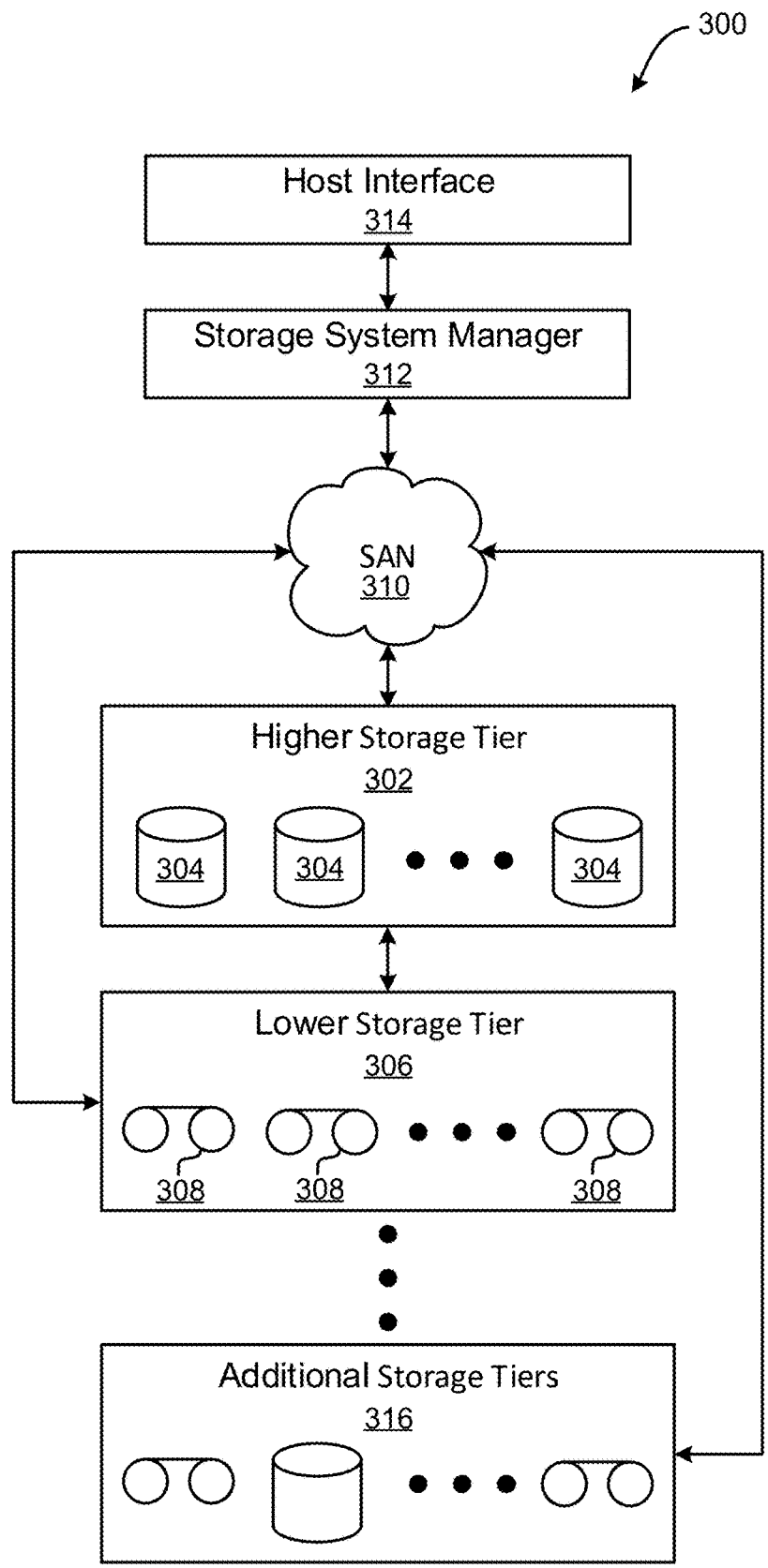
FIG. 3 illustrates a tiered data storage system in accordance with one embodiment.

Now referring to FIG. 3, a storage system 300 is shown according to one embodiment. Note that some of the elements shown in FIG. 3 may be implemented as hardware and/or software, according to various embodiments. The storage system 300 may include a storage system manager 312 for communicating with a plurality of media on at least one higher storage tier 302 and at least one lower storage tier 306. The higher storage tier(s) 302 preferably may include one or more random access and/or direct access media 304, such as hard disks in hard disk drives (HDDs), nonvolatile memory (NVM), solid state memory in solid state drives (SSDs), flash memory, SSD arrays, flash memory arrays, etc., and/or others noted herein or known in the art. The lower storage tier(s) 306 may preferably include one or more lower performing storage media 308, including sequential access media such as magnetic tape in tape drives and/or optical media, slower accessing HDDs, slower accessing SSDs, etc., and/or others noted herein or known in the art. One or more additional storage tiers 316 may include any combination of storage memory media as desired by a designer of the system 300. Also, any of the higher storage tiers 302 and/or the lower storage tiers 306 may include some combination of storage devices and/or storage media.

The storage system manager 312 may communicate with the storage media 304, 308 on the higher storage tier(s) 302 and lower storage tier(s) 306 through a network 310, such as a storage area network (SAN), as shown in FIG. 3, or some other suitable network type. The storage system manager 312 may also communicate with one or more host systems (not shown) through a host interface 314, which may or may not be a part of the storage system manager 312. The storage system manager 312 and/or any other component of the storage system 300 may be implemented in hardware and/or software, and may make use of a processor (not shown) for executing commands of a type known in the art, such as a central processing unit (CPU), a field programmable gate array (FPGA), an application specific integrated circuit (ASIC), etc. Of course, any arrangement of a storage system may be used, as will be apparent to those of skill in the art upon reading the present description.

In more embodiments, the storage system 300 may include any number of data storage tiers, and may include the same or different storage memory media within each storage tier. For example, each data storage tier may include the same type of storage memory media, such as HDDs, SSDs, sequential access media (tape in tape drives, optical disk in optical disk drives, etc.), direct access media (CD-ROM, DVD-ROM, etc.), or any combination of media storage types. In one such configuration, a higher storage tier 302, may include a majority of SSD storage media for storing data in a higher performing storage environment, and remaining storage tiers, including lower storage tier 306 and additional storage tiers 316 may include any combination of SSDs, HDDs, tape drives, etc., for storing data in a lower performing storage environment. In this way, more frequently accessed data, data having a higher priority, data needing to be accessed more quickly, etc., may be stored to the higher storage tier 302, while data not having one of these attributes may be stored to the additional storage tiers 316, including lower storage tier 306. Of course, one of skill in the art, upon reading the present descriptions, may devise many other combinations of storage media types to implement into different storage schemes, according to the embodiments presented herein.

According to some embodiments, the storage system (such as 300) may include logic configured to receive a request to open a data set, logic configured to determine if the requested data set is stored to a lower storage tier 306 of a tiered data storage system 300 in multiple associated portions, logic configured to move each associated portion of the requested data set to a higher storage tier 302 of the tiered data storage system 300, and logic configured to assemble the requested data set on the higher storage tier 302 of the tiered data storage system 300 from the associated portions.

Of course, this logic may be implemented as a method on any device and/or system or as a computer program product, according to various embodiments.

Figure 4:
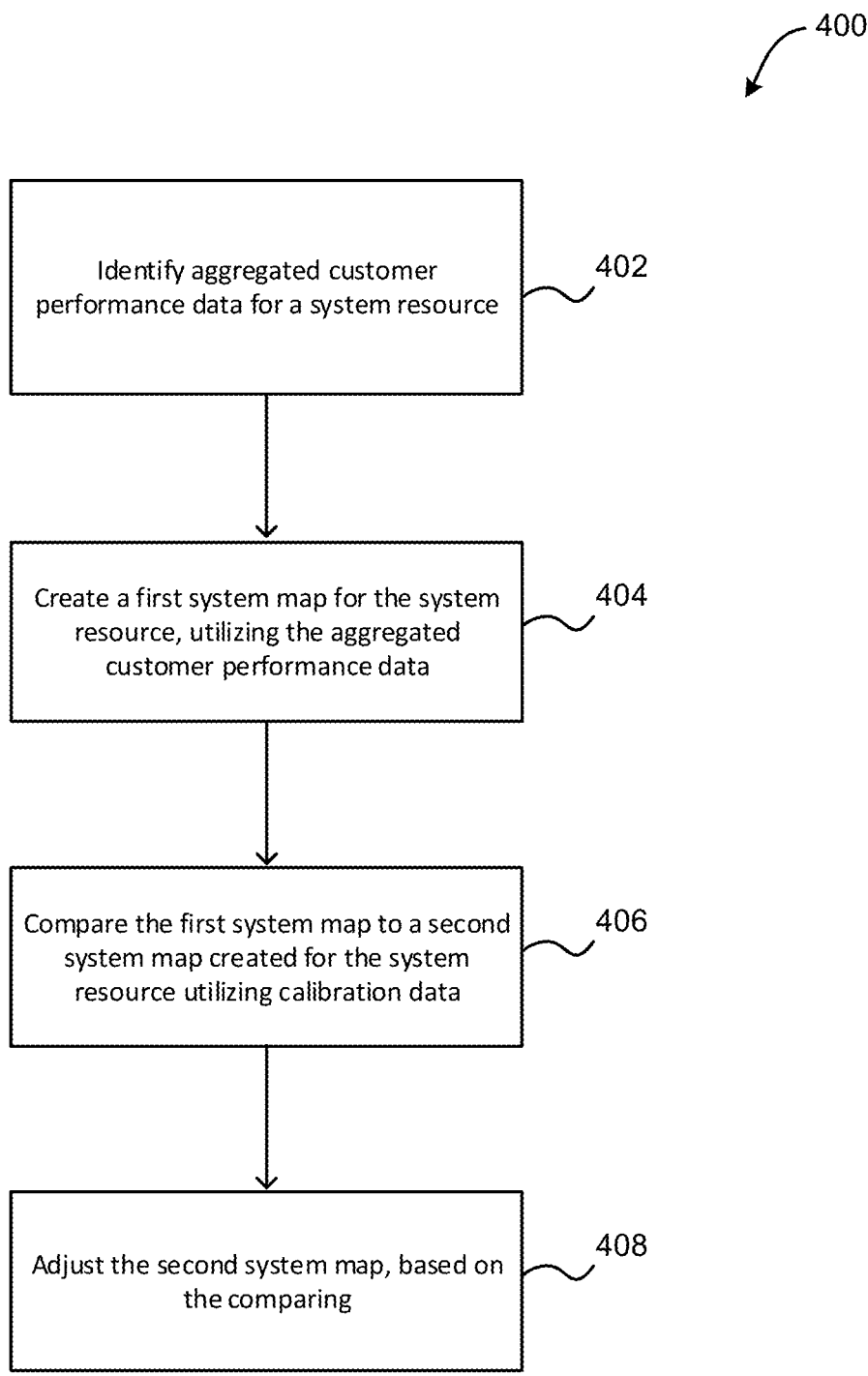
FIG. 4 illustrates a method for improving storage system performance models based on empirical component utilization, in accordance with one embodiment.

Now referring to FIG. 4, a flowchart of a method 400 is shown according to one embodiment. The method 400 may be performed in accordance with the present invention in any of the environments depicted in FIGS. 1-3, among others, in various embodiments. Of course, more or less operations than those specifically described in FIG. 4 may be included in method 400, as would be understood by one of skill in the art upon reading the present descriptions.

Each of the steps of the method 400 may be performed by any suitable component of the operating environment. For example, in various embodiments, the method 400 may be partially or entirely performed by one or more servers, computers, or some other device having one or more processors therein. The processor, e.g., processing circuit(s), chip(s), and/or module(s) implemented in hardware and/or software, and preferably having at least one hardware component may be utilized in any device to perform one or more steps of the method 400. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 4, method 400 may initiate with operation 402, where aggregated customer performance data for a system resource is identified. In one embodiment, the customer performance data may be received from a storage system (e.g., a database, a cloud-based storage system, etc.). In another embodiment, the system resource may include a component of the storage system. For example, the system resource may include one or more of a device adapter, a host bus adapter, a RAID array, a channel, a bus, etc.

Additionally, in one embodiment, the customer performance data may be associated with a predetermined configuration of the system resource. For example, the system resource may include a redundant array of independent disks (RAID) array, and the predetermined configuration may include a RAID-5 configuration, a RAID-6 configuration, etc. In another embodiment, the customer performance data may be received at a system other than the storage system. For example, the customer performance data may be received at one or more servers, a cloud computing environment, a big data analytics environment, etc.

Further, in one embodiment, the customer performance data may be aggregated at the system other than the storage system. In another embodiment, the customer performance data may include the performance of the system resource in response to usage of the system resource by a plurality of different customers of the storage system. In yet another embodiment, the customer performance data may include one or more performance counters. For example, the storage system may collect and send one or more counters and calculations via a "call home" mechanism.

Further, as shown in FIG. 4, method 400 may proceed with operation 404, where a first system map is created for the system resource, utilizing the aggregated customer performance data. In one embodiment, creating the first system map may include filtering the aggregated customer performance data. For example, a subset of the aggregated customer performance data may be determined that shares one or more predetermined characteristics with calibration data (e.g., a calibration workload, etc.). In another example, the calibration data may include a set of laboratory measurements used to calibrate one or more assumptions within a model. In yet another example, the model may include a performance and capacity sizing model for the storage system.

Also, in one embodiment, creating the first system map may include estimating one or more customer performance service time overheads for the system resource, utilizing the filtered portion of the aggregated customer performance data. In another embodiment, the first system map may be generated utilizing the one or more customer performance service time overheads. In yet another embodiment, the system map may include a mapped curve representing an interaction between different aspects of performance data for the system resource.

For example, the system map may include a curve representing (1) a ratio of a service time (e.g., a time taken for the system resource to service a request, etc.) to a service time+queue time (e.g., a time taken for the system resource to respond to the request, etc.) versus (2) a utilization of the system resource during the servicing of the request. In another example, the system map may include a curve representing an average response time versus resource utilization. In yet another example, the system map may include a curve representing service time versus response time.

In addition, in one embodiment, the first system map may be determined utilizing a general purpose utilization monitor (GPUM) of a type known in the art. For example, the GPUM may perform dynamic monitoring of utilization within the storage system to calculate utilization of the system resource based on customer usage. In another example, the GPUM may periodically reassess a maximum number c of concurrent operations that the storage system is able to support without a need to queue requests. In yet another example, the GPUM may compare c against N, the average number of outstanding requests based on recent measurements.

In addition, as shown in FIG. 4, method 400 may proceed with operation 406, where the first system map is compared to a second system map created for the system resource utilizing calibration data. In one embodiment, the calibration data may be generated by running a set of synthetic benchmarks against the storage system and measuring a response. In another embodiment, the set of synthetic benchmarks may be run against the storage system in a laboratory setting.

Further still, in one embodiment, the one or more calibration service time overheads may be estimated for the system resource, utilizing the calibration data. In another embodiment, the second system map may be generated utilizing the one or more calibration service time overheads. In yet another embodiment, comparing the first system map to the second system map may include determining one or more differences between the first system map and the second system map.

Also, as shown in FIG. 4, method 400 may proceed with operation 408, where the second system map is adjusted, based on the comparing. In one embodiment, the second system map may be adjusted to eliminate or reduce any differences between the first system map and the second system map. In this way, the second system map may become more representative of empirical customer usage of the system resource. Additionally, the adjusting may increase an accuracy of the performance and capacity sizing model for the storage system. For example, the adjusting may result in more accurate approximations of service time overheads, increased performance of the storage system, etc.

Further, in one embodiment, additional calibration workloads may be created based on the aggregated customer performance data. These calibration workloads may be added to the performance and capacity sizing model for the storage system. The additional calibration workloads may also include one or more additional performance counters.

Performance and Capacity Sizing Models

Performance and capacity sizing models for storage systems may make assumptions about overheads of system resources. One such overhead may include the service time, which is the average amount of time and data input/output (I/O) spent in a given component when there is no queuing. These service time overheads may be different for various components, such as device adapters, host bus adapters, RAID arrays, etc. The overheads may also be different depending on component configurations, such as whether a RAID array is RAID-5 or RAID-6. The overheads may be estimated by adjusting model parameters so that modeled component utilization reaches 100% at the same level of load as a physical system in a lab environment running a series of validation workloads.

In one embodiment, validation workloads may include the so called "4 corners": read miss, read hit, write miss, and write hit. In these workloads the transfer size may be small (e.g., 4 KB, etc.). Large transfer (>128 KB) sequential read and write workloads may also be used for validation of model parameters.

Additionally, in one embodiment, when performing sizing model validation, customer usage of the storage system may be more complex than model or lab validation workloads account for. Therefore, a way of improving sizing models may include analyzing customer performance data and calculating overheads/service times using a General Purpose Utilization Monitor (GPUM). The overheads from customer data may then be compared to modeled overheads. Where there is a discrepancy resulting from the comparison, the model may be enhanced. Over time, as the sample size of customer data increases, the model may become increasingly accurate.

Further, in one embodiment, a set of performance counters and configuration data may be received from a storage system. The set of performance counters and configuration data may then be aggregated. A subset of customer data may be selected that is similar in nature to the validation workloads used in a lab environment (e.g., where a component bottleneck is known and overheads may be compared, etc.).

In one embodiment, customer performance data may be collected, aggregated, and analyzed so that sizing models may be continually improved. Current sizing models may rely on a small set of lab measurements to calibrate the model's assumptions. The model may be thought of as a set of dynamically generated system maps for components based on an input workload. Here a system map may include a curve representing a ratio of service time to service time+response time versus the utilization.

Currently there is little feedback from customer environments as to the accuracy of the model's predictions. However, performance counters and utilization data may be received from storage systems via a "call-home" mechanism. The data may then be aggregated and filtered in such a way that one may arrive at a set of system maps that may be compared to those generated by the model. The model may then be adjusted (e.g., by changing service time overheads, etc.) to become more accurate.

Storage Performance Modeling

In one embodiment, performance sizing models may estimate service time overheads for components in a storage subsystem. Examples of components or resources may include device adapters, host bust adapters, RAID arrays, etc. In general, an overhead can be written as $O=C0+C1*(X/D)$, where $C0$ and $C1$ are fixed constants, $X$ is I/O transfer size, and $D$ is I/O data rate. Each overhead may have two parts, one that is fixed and one that is dependent on I/O size and throughput.

A sizing model may contain many overheads, each associated with a different component or with a specific configuration of a component. For some components, $C1$ may be zero; for others, it will be equal to one. In general, $C1$ may be any non-negative number.

In another embodiment, the overheads may be estimated using a set of calibration data. The calibration data may be generated by running a set of synthetic benchmarks against the storage system and measuring the response. For each benchmark, the load on the system may be increased, and the result may include a set of points representing the response time throughput curve. From the response time throughput curve data, the values of $C0$ and $C1$ may be estimated. Because $X$ and $D$ are measured, the overhead $O$ may be calculated. With a complete set of overheads, the model may generate its own response time throughput curve for a given configuration.

In yet another embodiment, the model may be validated by determining that the fixed service time is in agreement with the empirical curve, and that the utilization reaches 100% in the model at the same level of load as the test system. In another embodiment, the model may be calculated using formulae from queueing theory by assuming that a particular component fits a well described queue model, such as an M/M/c queue, etc. Once the utilization is calculated, a system map may be generated, which may include a curve representing the ratio of service time to service time+response time versus the utilization.

The sizing model may then include a set of internal assumptions and calculations that results in a set of systems maps for components and workloads.

General Purpose Utilization Monitor

In one embodiment, instead of using specific queueing models to calculate utilization for components, a general purpose utilization monitor (GPUM) may be used. The GPUM may perform dynamic monitoring of system utilization by periodically reassessing the maximum number c of concurrent operations the system is able to support without the need to queue requests, and comparing it against N, the average number of outstanding requests based on recent measurements. One benefit of calculating utilization using the GPUM is that the GPUM may not require any specific knowledge of the details of the underlying physical components. The GPUM may therefore provide a unified approach for calculating utilization based on customer usage.

In one embodiment, a set of performance counters and data may be received from one or more storage systems, and the customer data may be analyzed to produce validation data for sizing models.

Performance Counters

Table 1 illustrates exemplary counters and calculations that may be received on a periodic basis from a storage system via a "call-home" mechanism, in accordance with one embodiment. Of course, it should be noted that the exemplary counters and calculations shown in Table 1 are set forth for illustrative purposes only, and thus should not be construed as limiting in any manner.

Table 1

A time period for counters
A number of read/write operations performed at the storage system
A number of cache hits/misses performed at the storage system
An accumulated read/write I/O time performed at the storage system
A number of outstanding read/write requests at the storage system
An average read/write transfer size performed at the storage system
A number of cache prestage operations performed at the storage system
A number of cache destage operations performed at the storage system
A number of full-stripe write operations performed at the storage system
A utilization based on a GPUM calculation
A service time inferred from the GPUM calculation In one embodiment, the counters in Table 1 may be collected for each component of interest to the sizing model (e.g., for each device adapter, host bust adapter, RAID array, etc.).

In another embodiment, the data received from customer storage systems may be stored. The data may then be aggregated and filtered in order to obtain a set of system maps that may be compared to what the model generates. If there are discrepancies between the maps generated based on model data and the maps generated based on customer data, the model may be adjusted to eliminate such discrepancies. Over time, as the sample size of data increases, the systems maps may become more representative of customer usage, and the sizing model may become increasingly accurate.

Pseudocode RAID Example

Table 2 illustrates exemplary pseudocode for comparing a RAID-6 Read Miss system map to a modeled system map, in accordance with one embodiment. Of course, it should be noted that the exemplary pseudocode shown in Table 2 is set forth for illustrative purposes only, and thus should not be construed as limiting in any manner.

Table 2

For customer data having transfer size>512 bytes and <4 KiB:
  For data having RAID=RAID-6:
    For data having cache hit %<1%:
      return system map data→S
Fit curve to S using GPUM or "French curve" model.
Compare S to Read Miss system map from model.
Adjust model component overheads to match empirical curve if differences are more than a predetermined threshold As shown in Table 2, received customer data having a small transfer size (between 512 bytes and 4 KB) is identified as a first subset. From this first subset of received customer data, data using RAID-6 is identified as a second subset. From this second subset of received customer data, data having a small hit percentage (less than 1%) is identified as a third subset. From this third subset of received customer data, a system map curve is generated to that data using the GPUM application or a "French curve" model. This system map curve is then compared to a system map curve created using a model in a lab environment. If the two system map curves have differences greater than a predetermined threshold, one or more component overheads of the system model are adjusted so that the two system map curves have a reduced difference less than the predetermined threshold.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein includes an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which includes one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Moreover, a system according to various embodiments may include a processor and logic integrated with and/or executable by the processor, the logic being configured to perform one or more of the process steps recited herein. By integrated with, what is meant is that the processor has logic embedded therewith as hardware logic, such as an application specific integrated circuit (ASIC), a FPGA, etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

It will be clear that the various features of the foregoing systems and/or methodologies may be combined in any way, creating a plurality of combinations from the descriptions presented above.

It will be further appreciated that embodiments of the present invention may be provided in the form of a service deployed on behalf of a customer to offer service on demand.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:
1. A computer-implemented method, comprising:
    identifying aggregated customer performance data for a system resource;
    creating a first system map for the system resource, utilizing the aggregated customer performance data, wherein the first system map is created utilizing a general purpose utilization monitor (GPUM);

comparing the first system map to a second system map created for the system resource utilizing calibration data; and adjusting the second system map, based on the comparing.

2. A computer program product for improving storage system performance models based on empirical component utilization, the computer program product comprising a computer readable storage medium having program instructions embodied therewith, wherein the computer readable storage medium is not a transitory signal per se, the program instructions executable by a processor to cause the processor to perform a method comprising:

identifying aggregated customer performance data for a system resource, utilizing the processor;

creating a first system map for the system resource, utilizing the aggregated customer performance data, utilizing the processor, wherein the first system map is created utilizing a general purpose utilization monitor (GPUM);

comparing the first system map to a second system map created for the system resource utilizing calibration data, utilizing the processor; and adjusting the second system map based on the comparing, utilizing the processor.

3. A system, comprising:

a processor; and logic integrated with the processor, executable by the processor, or integrated with and executable by the processor, the logic being configured to:

identify aggregated customer performance data for a system resource;

create a first system map for the system resource, utilizing the aggregated customer performance data, wherein the first system map is created utilizing a general purpose utilization monitor (GPUM);

compare the first system map to a second system map created for the system resource utilizing calibration data; and adjust the second system map, based on the comparison.

4. The computer-implemented method of claim 1, wherein the system resource includes a component of a storage system.

5. The computer-implemented method of claim 1, wherein the aggregated customer performance data includes a performance of the system resource in response to usage of the system resource by a plurality of different customers of a storage system.

6. The computer-implemented method of claim 1, wherein creating the first system map includes filtering the aggregated customer performance data, including determining a subset of the aggregated customer performance data that shares one or more predetermined characteristics with the calibration data.

7. The computer-implemented method of claim 1, wherein the calibration data includes a set of laboratory measurements used to calibrate one or more assumptions within a performance and capacity sizing model for a storage system.

8. The computer-implemented method of claim 1, wherein creating the first system map includes estimating one or more customer performance service time overheads for the system resource, utilizing a filtered portion of the aggregated customer performance data, and generating the first system map utilizing the one or more customer performance service time overheads.

9. The computer-implemented method of claim 1, wherein the calibration data is generated by running a set of synthetic benchmarks against a storage system and measuring a response in a laboratory setting.

10. The computer-implemented method of claim 1, wherein comparing the first system map to the second system map includes determining one or more differences between the first system map and the second system map.

11. The computer program product of claim 2, wherein the system resource includes a component of the storage system.

12. The computer program product of claim 2, wherein the aggregated customer performance data includes a performance of the system resource in response to usage of the system resource by a plurality of different customers of a storage system.

13. The computer program product of claim 2, wherein creating the first system map includes filtering the aggregated customer performance data, including determining a subset of the aggregated customer performance data that shares one or more predetermined characteristics with the calibration data, utilizing the processor.

14. The computer program product of claim 2, wherein the calibration data includes a set of laboratory measurements used to calibrate one or more assumptions within a performance and capacity sizing model for a storage system.

15. The computer program product of claim 2, wherein creating the first system map includes estimating one or more customer performance service time overheads for the system resource, utilizing a filtered portion of the aggregated customer performance data, and generating the first system map utilizing the one or more customer performance service time overheads, utilizing the processor.

16. The computer program product of claim 2, wherein the calibration data is generated by running a set of synthetic benchmarks against a storage system and measuring a response in a laboratory setting.

17. The computer program product of claim 2, wherein comparing the first system map to the second system map includes determining one or more differences between the first system map and the second system map, utilizing the processor.

18. The computer-implemented method of claim 10, wherein the second system map is adjusted to eliminate or reduce the one or more differences between the first system map and the second system map.

* * * * *